US008135380B1

(12) United States Patent  
Vargantwar (10) Patent No.: US 8,135,380 B1  
(45) Date of Patent: Mar. 13, 2012

(54) LOCATION ENHANCEMENT FOR EMERGENCY SERVICE SESSIONS OF WIRELESS COMMUNICATION DEVICES

(75) Inventor: Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 271 days.

(21) Appl. No.: 12/482,877

(22) Filed: Jun. 11, 2009

(51) Int. Cl.
H04M 11/04 (2006.01)
(52) U.S. Cl. .................. 455/404.2; 455/434; 455/456.6; 455/521
(58) Field of Classification Search ............... 455/404.1, 455/404.2, 456.6, 521, 456.1
See application file for complete search history.

(56) References Cited

U.S. PATENT DOCUMENTS

| | | | |
|---|---|---|---|
| 5,945,948 A * | 8/1999 | Buford et al. .................. 342/457 |
| 6,493,328 B2 | 12/2002 | Fong et al. |
| 7,006,821 B2 * | 2/2006 | Tee ................................. 455/421 |
| 7,366,492 B1 * | 4/2008 | Ganesh ........................ 455/404.2 |
| 2007/0275734 A1 * | 11/2007 | Gaal et al. ................... 455/456.6 |

* cited by examiner

Primary Examiner — Kwasi Karikari  
Assistant Examiner — Christopher Kohlman (57) ABSTRACT

What is disclosed is a method of operating a wireless communication device to handle an emergency service session. The method includes monitoring pilot signals from a plurality of wireless access nodes in a wireless communication network to determine an active set as a subset of the wireless access nodes. The method also includes, in response to a request for an emergency service, modifying the active set to identify at least one additional wireless access node from the plurality of wireless access nodes, resulting in a modified active set. The method also includes generating and transferring a request for the emergency service session, transferring the modified active set for delivery to the wireless communication network to assist with determining a location of the wireless communication device, and exchanging communications of the emergency service session with the wireless communication network.

20 Claims, 6 Drawing Sheets

LOCATION ENHANCEMENT FOR EMERGENCY SERVICE SESSIONS OF WIRELESS COMMUNICATION DEVICES

TECHNICAL FIELD

Aspects of the disclosure are related to the field of communications, and in particular, locating wireless communication devices in wireless communication networks.

TECHNICAL BACKGROUND

Wireless communication devices typically receive wireless communication service through wireless access nodes, such as base stations. In many examples, the wireless communication devices are mobile, and can move between coverage areas of different wireless access nodes in a wireless communication system.

Access to traditional emergency services, such as police, fire, ambulance, or 911 services are typically provided by the wireless communication system as part of the various wireless communication services offered to users of the wireless communication devices. However, due to the wireless or mobile nature of wireless communication devices, it can be difficult for the emergency service providers to locate a wireless communication device requesting an emergency service.

Some techniques have been developed to locate a wireless communication device requesting an emergency service, such as triangulation and using global-positioning system (GPS) equipment. Unfortunately, not all wireless communication devices incorporate GPS equipment, and in many examples, triangulation in a wireless communication system relies on methods which can lead to inaccurate locations of wireless communication devices.

OVERVIEW

What is disclosed is a method of operating a wireless communication device to handle an emergency service session. The method includes monitoring pilot signals from a plurality of wireless access nodes in a wireless communication network to determine an active set, where the active set identifies a subset of the plurality of wireless access nodes. The method also includes, in response to a request for an emergency service by a user of the wireless communication device, modifying the active set to identify at least one additional wireless access node from the plurality of wireless access nodes, resulting in a modified active set. The method also includes generating and transferring a request for the emergency service session for delivery to the wireless communication network to establish the emergency service session with the emergency service, transferring the modified active set for delivery to the wireless communication network to assist with determining a location of the wireless communication device, and exchanging communications of the emergency service session with the wireless communication network.

What is also disclosed is a wireless communication device to handle an emergency service session. The wireless communication device includes a communication interface configured to monitor pilot signals from a plurality of wireless access nodes in a wireless communication network, and a processing system configured to process the pilot signals to determine an active set, where the active set identifies a subset of the plurality of wireless access nodes. In response to a request for an emergency service by a user of the wireless communication device, the processing system is configured to modify the active set to identify at least one additional wireless access node from the plurality of wireless access nodes, resulting in a modified active set, and generate a request for the emergency service session to establish the emergency service session with the emergency service. The communication interface is configured to transfer the request for the emergency service session for delivery to the wireless communication network, transfer the modified active set for delivery to the wireless communication network to assist with determining a location of the wireless communication device, and exchange communications of the emergency service session with the wireless communication network.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
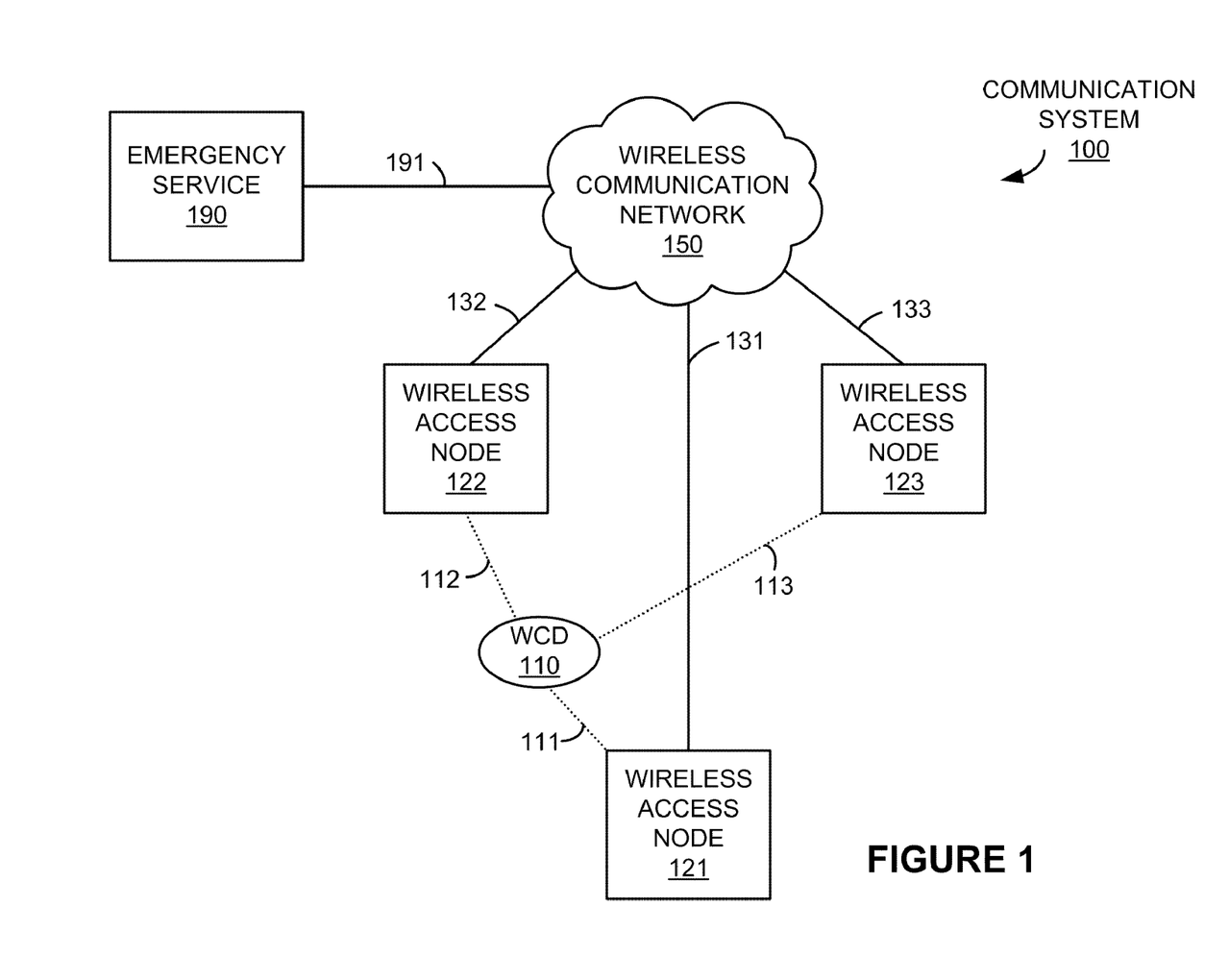
FIG. 1 is a system diagram illustrating a communication system.

FIG. 1 is a system diagram illustrating communication system 100. Communication system 100 includes wireless communication device (WCD) 110, wireless access nodes 121-123, wireless communication network 150, and emergency service 190. Wireless communication device 110 and wireless access nodes 121-123 communicate over wireless links 111-113, respectively. Wireless access nodes 121-123 and wireless communication network 150 communicate over links 131-133, respectively. Wireless communication network 150 and emergency service 190 communicate over link 191.

Figure 2:
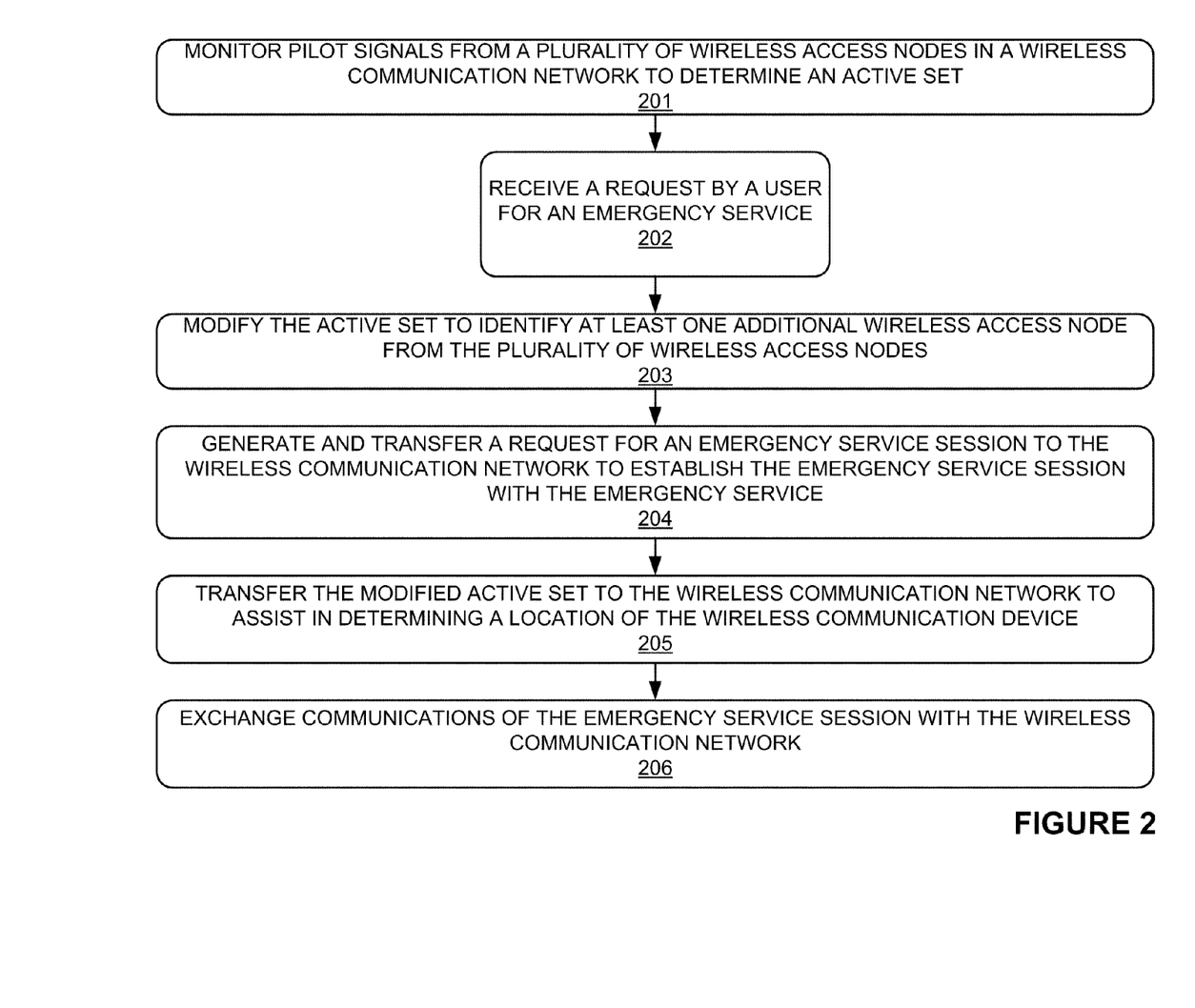
FIG. 2 is a flow diagram illustrating a method of operation of a communication system.

FIG. 2 is a flow diagram illustrating a method of operation of communication system 100, as shown in FIG. 1. The operations in FIG. 2 are listed herein parenthetically. In FIG. 2, wireless communication device 110 monitors (201) pilot signals from a plurality of wireless access nodes to determine an active set. In this example, wireless communication device 110 determines the active set to identify wireless access node 121, which is a subset of the plurality of wireless access nodes 121-123 in FIG. 1. It should be understood that different wireless access nodes could be included in the active set.

An active set is a group of wireless access nodes with which wireless communication device 110 is currently exchanging communications. In some examples, the active set includes wireless access nodes that wireless communication device 110 is in a soft handoff process with. A pilot signal associated with each of the plurality of wireless access nodes is typically monitored by wireless communication device 110 to determine information related to wireless access nodes 121-123 and wireless communication network 150 used in the initial registration process of wireless communication device 110. In many examples, the pilot signals of wireless access nodes 121-123 are also used in handoffs, where wireless communication device 110 changes from receiving communication service from one wireless access node to another wireless access node. The information monitored by wireless communication device 110 about the pilot signals could include detected properties related to the pilot signals, such as received RF signal strength or RF conditions, or could include information relating to the status of wireless access nodes 121-123 or wireless links 111-113, or other information.

In response to a request (202) for emergency service 190 by a user of wireless communication device 110, wireless communication device 110 modifies (203) the active set to identify at least one additional wireless access node from the plurality of wireless access nodes, resulting in a modified active set. The modified active set, in this example, includes identifying at least wireless access node 122 to add into the active set, in addition to the previously identified wireless access node 121. It should be understood that different wireless access nodes could be included in the modified active set.

Identifying an additional wireless access node to add into the active set to create a modified active set could entail changing parameters related to monitoring the pilot signals of wireless access nodes 121-123. For example, if the RF signal strength of a pilot signal must cross a threshold level to identify the wireless access node associated with the pilot signal in the active set, then the threshold level could be changed to increase the number of wireless access nodes identified in the active set. In some examples, identifying an additional wireless access node to add into the active set includes initiating a soft handoff with the newly added wireless access node.

An emergency service can include services provided to a user of wireless communication device 110 for medical, law enforcement, fire, or other purposes. In some examples, the request for emergency service 190 includes the user of wireless communication device 110 placing a call over an emergency number, such as a 911 call. In further examples, the request for emergency service 190 includes the user of wireless communication device 110 requesting emergency service 190 over a text message, email, web page, user application, or other communication service type on wireless communication device 110.

Wireless communication device 110 then generates and transfers (204) a request for an emergency service session for delivery to wireless communication network 150 to establish the emergency service session with emergency service 190. In this example, the request for the emergency service session is transferred through a wireless access node for delivery to wireless communication network 150. The wireless access node through which the request for the emergency service session is transferred is typically the wireless access node that wireless communication device 110 is currently registered for communication service with. In many examples, wireless communication device 110 will be registered for communication service with one of the wireless access nodes in the active set or modified active set.

Wireless communication device 110 transfers (205) the modified active set for delivery to wireless communication network 150 to assist in determining a location of wireless communication device 110. In this example, the modified active set is transferred through a wireless access node for delivery to wireless communication network 150, as discussed above.

When wireless communication network 150 receives the request for the emergency service session, wireless communication network 150 will attempt to locate wireless communication device 110. This location aids emergency service 190 in providing emergency service to the user of wireless communication device 110. For example, if the request for emergency service includes a request for fire services, it can be important to accurately locate where the request originated.

Wireless communication device 110 then exchanges (206) communications of the emergency service session with wireless communication network 150. These communications could include a voice call, text message conversation, user application traffic, or other communications carried over wireless communication network 150. The communications could further be exchanged with emergency service 190 in many examples.

In conventional circuit-switched telephones, the location of a user is typically associated with a wired connection to a home or business. However, with wireless communication devices, this location can vary, especially if the wireless communication device is mobile. If wireless communication device 110 incorporates a global positioning system (GPS) receiver, location information obtained via GPS could be provided to wireless communication network 150 to assist in determining a location. However, if wireless communication device 110 does not incorporate a GPS receiver, other methods may be employed to locate wireless communication device 110. Some examples include using terrestrial position determining equipment (PDE) to calculate a probable geographic position of wireless communication device 110 based upon signals detected at a number of wireless access nodes, such as by the technique of triangulation. Advantageously, by increasing the number of wireless access nodes identified in the active set in response to a request for emergency service, the accuracy of terrestrial position determining equipment can be improved. Thus, the location of wireless communication device 110 can be established more accurately, and emergency services can be deployed more effectively.

Referring back to FIG. 1, wireless communication device (WCD) 110 comprises radio frequency (RF) communication circuitry and an antenna. The RF communication circuitry typically includes amplifiers, filters, modulators, and signal processing circuitry. Wireless communication device 110 may also include a user interface, memory device, computer-readable storage medium, software, processing circuitry, or some other communication components. Wireless communication device 110 may be a telephone, computer, e-book, mobile Internet appliance, wireless network interface card, media player, game console, or some other wireless communication apparatus, including combinations thereof. In many examples, wireless communication device 110 is a mobile communication device.

Wireless access nodes 121-123 each comprise RF communication and control circuitry and an antenna. The RF communication circuitry typically includes amplifiers, filters, RF modulators, and signal processing circuitry. Wireless access nodes 121-123 may also each comprise a router, server, memory device, software, processing circuitry, cabling, power supply, network communication interface, physical structural support, or some other communication apparatus. Wireless access nodes 121-123 each could be a base station, base transceiver station, Internet access node, telephony service node, wireless data access point, or some other wireless communication system, including combinations thereof.

Wireless communication network 150 comprises the core network of a wireless communications provider, and could include routers, gateways, telecommunication switches, processing systems, or other communications equipment and systems for providing communication and data services. Wireless communication network 150 may also comprise optical networks, asynchronous transfer mode (ATM) networks, packet networks, metropolitan-area networks (MAN), or other network topologies, equipment, or systems, including combinations thereof.

Emergency service 190 could include services available to a user of a wireless communication device for medical, law enforcement, fire, or other purposes. Emergency service 190 could also include a dispatch system for handling requests for emergency service, and is typically operated by government departments or agencies, civilian service providers, medical providers, first-response providers, or other third-party entities. Since, in many examples, requests for emergency services could arrive over an emergency number, such as a 911 call, or by other methods, such as over a text message, email, web page, user application, or other communication service type, emergency service 190 includes equipment or systems to handle the various communication service types and arrival methods. Emergency service 190 also includes equipment or systems to receive location information associated with the emergency requests Wireless links 111-113 each use the air or space as the transport media. Wireless links 111-113 may each use various protocols, such as Code Division Multiple Access (CDMA), Evolution Data Optimized (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format, including combinations, improvements, or variations thereof.

Communication links 131-133 and 191 each use metal, glass, optical, air, space, or some other material as the transport media. Communication links 131-133 and 191 could each use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof.

Communication links 111-113, 131-133, and 191 may each include many different signals sharing the same link—as represented by the associated lines in FIG. 1—comprising access channels, forward links, reverse links, user communications, communication sessions, overhead communications, frequencies, timeslots, transportation ports, logical transportation links, network sockets, packets, or communication directions. Communication links 131-133 and 191 could each be direct links or may include intermediate networks, systems, or devices. In many examples of wireless links 111-113, a pilot signal is included in each wireless link.

Figure 3:
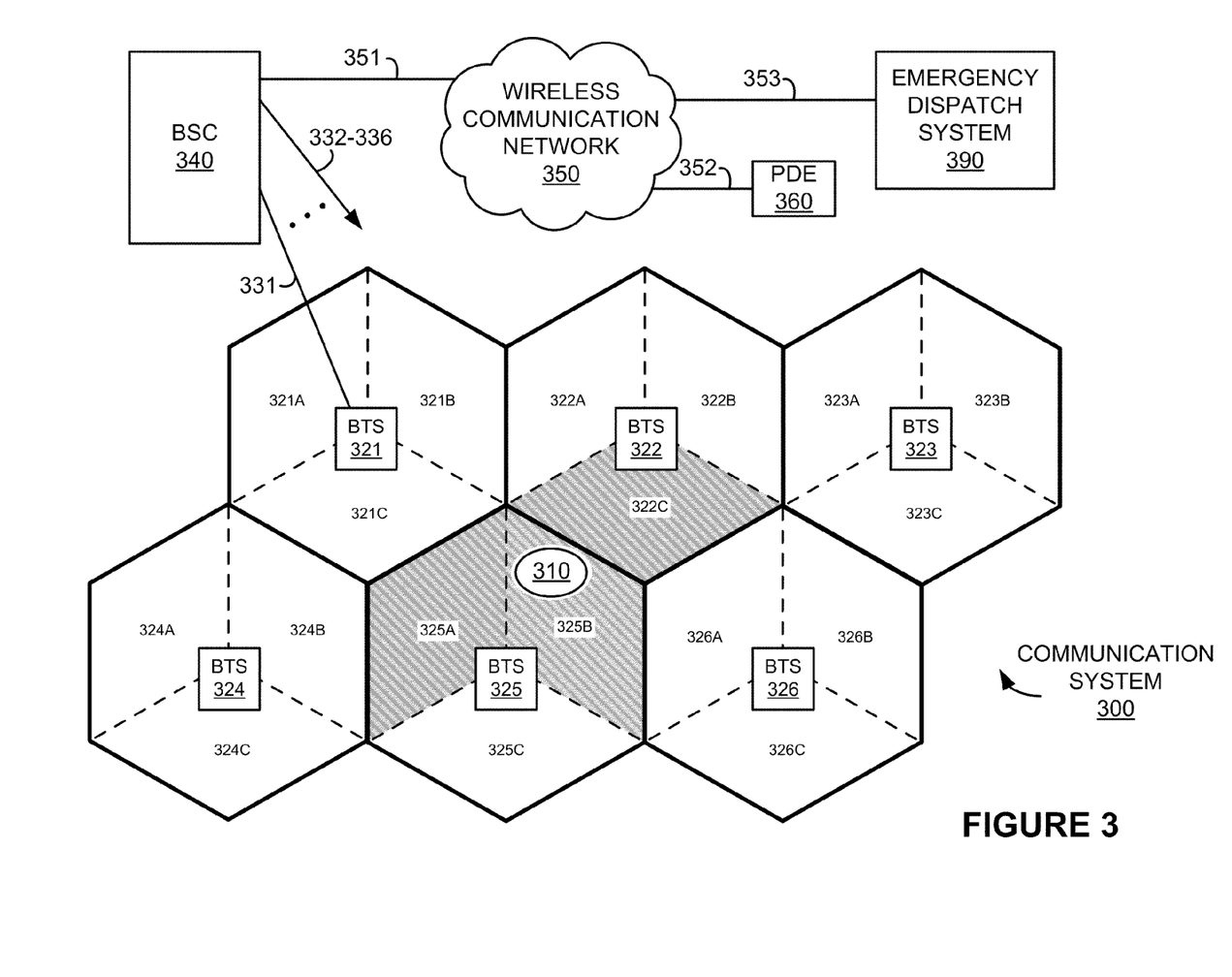
FIG. 3 is a system diagram illustrating a communication system.
Figure 4:
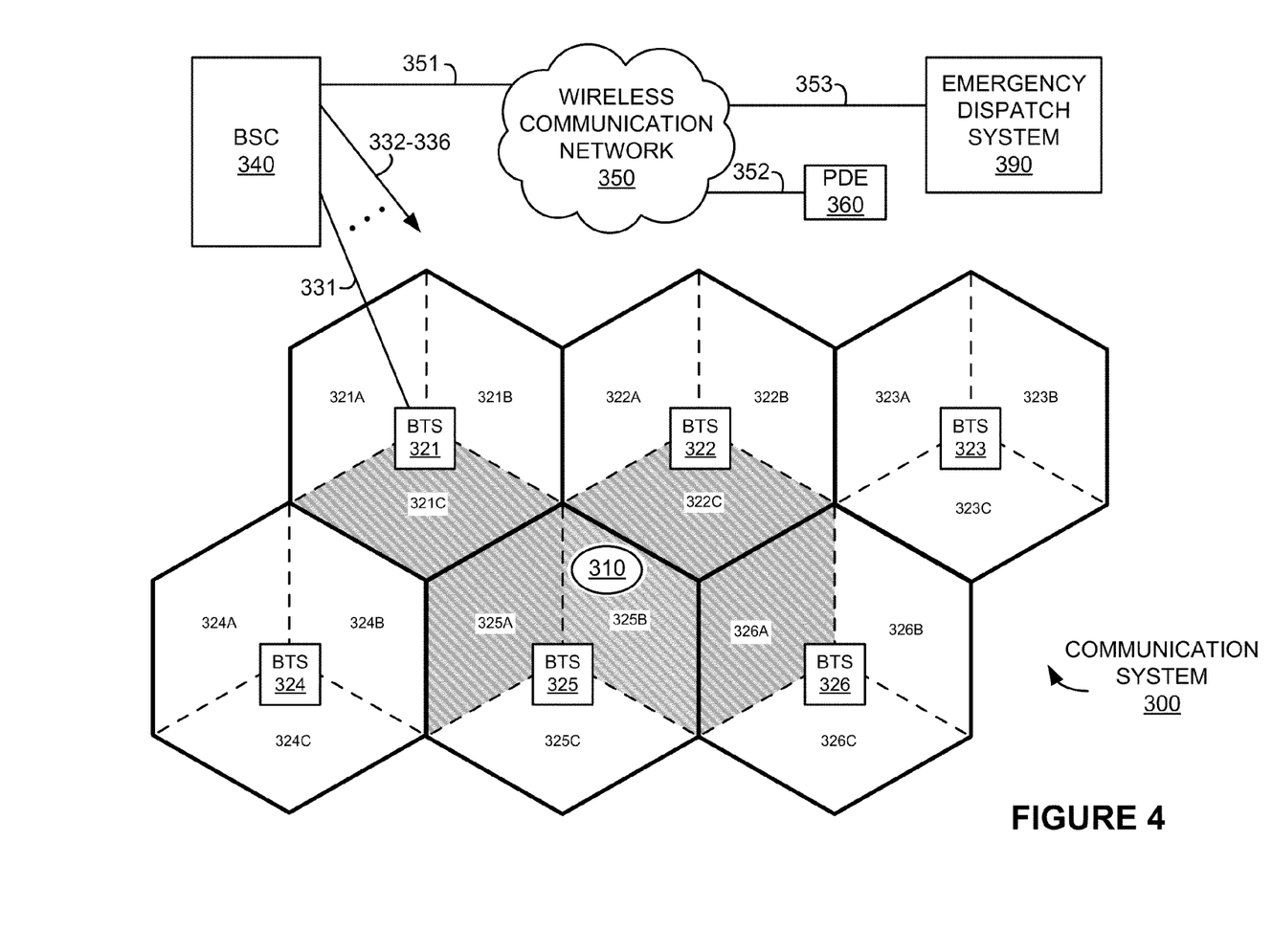
FIG. 4 is a system diagram illustrating a communication system.

FIGS. 3 and 4 are system diagrams illustrating communication system 300. Communication system 300 includes wireless communication device (WCD) 310, base transceiver stations 321-326, base station controller (BSC) 340, wireless communication network 350, terrestrial position determining equipment (PDE) 360, and emergency dispatch system 390. WCD 310 can receive pilot signals from each of BTS 321-326. BTS 321-326 communicate with BSC 340 over links 331-336, respectively. BSC 340 and wireless communication network 350 communicate over link 351. Wireless communication network 350 and LDE 360 communicate over link 352. Wireless communication network 350 and emergency dispatch system 390 communicate over link 353.

Wireless communication device (WCD) 310 is a mobile wireless telephone in this example. Base transceiver stations (BTS) 321-326 each include wireless communications equipment capable of communicating with and providing communication service to wireless communication devices. Wireless communication network 350 is a core network of a wireless communication provider in this example. Wireless communication network 350 could include further base transceiver stations, routers, gateways, controller systems, processing systems, or other communication equipment.

Base station controller (BSC) 340 includes equipment such as communication interfaces and processing systems for communicating with and controlling BTS 321-326. BSC 340 could also include communication equipment capable of routing communications exchanged between BTS 321-326 and wireless communication network 350 to further systems. In this example, BTS 321-326 are operated by the same service provider as BSC 340.

Terrestrial position determining equipment (PDE) system 390 includes equipment capable of determining a geographic position of WCD 310 in communication system 300 using terrestrial RF signals. Terrestrial position determining equipment (PDE) system 390 also includes equipment to transfer the geographic position of WCD 310 for delivery to emergency dispatch system 390.

Emergency dispatch system 390 includes a dispatch system for handling requests for emergency services, and is typically operated by government departments or agencies, civilian service providers, medical providers, first-response providers, or other third-party entities. Since, in this example, requests for emergency services arrive over emergency calls, such as 911 calls, emergency service 190 includes equipment or systems to handle the emergency calls and receive location information associated with the requests.

Although not shown for clarity in FIGS. 3 and 4, each of BTS 321-326 broadcasts pilot signals. Wireless communication device 310 can monitor the pilot signals of BTS 321-326. Links 331-336 and 351-353 each comprise a T1 communication link in this example.

As shown in FIGS. 3 and 4, BTS 321-326 each have a limited geographic range over which they can provide communication services to wireless communication devices. The limited range over which each BTS 321-326 can support communications with wireless communication devices is indicated by hexagonal-shaped coverage areas in FIGS. 3 and 4. Although a hexagonal region defining each coverage area is shown in FIGS. 3 and 4, it should be understood that the coverage areas could be of other shapes and configurations, as determined by geographic features, empirical data, the equipment of BTS 321-326, or by other factors, including combinations thereof. Also in the example shown in FIGS. 3 and 4, each hexagonal coverage area of BTS 321-326 is further divided into three sectors each, designated by a letter after the associated BTS element number, e.g. sector 321A. A sector can represent a particular region of wireless coverage, typically served by a single antenna, antenna array, or base transceiver station of an access node. Further base transceiver station equipment could be included in BTS 321-326 in examples where sectors are employed. In many examples, there are multiple sectors associated with a single wireless access node, antenna tower, or base station, with each sector describing a slice of the surrounding geographic region serviced by the wireless access node or BTS.

Figure 5:
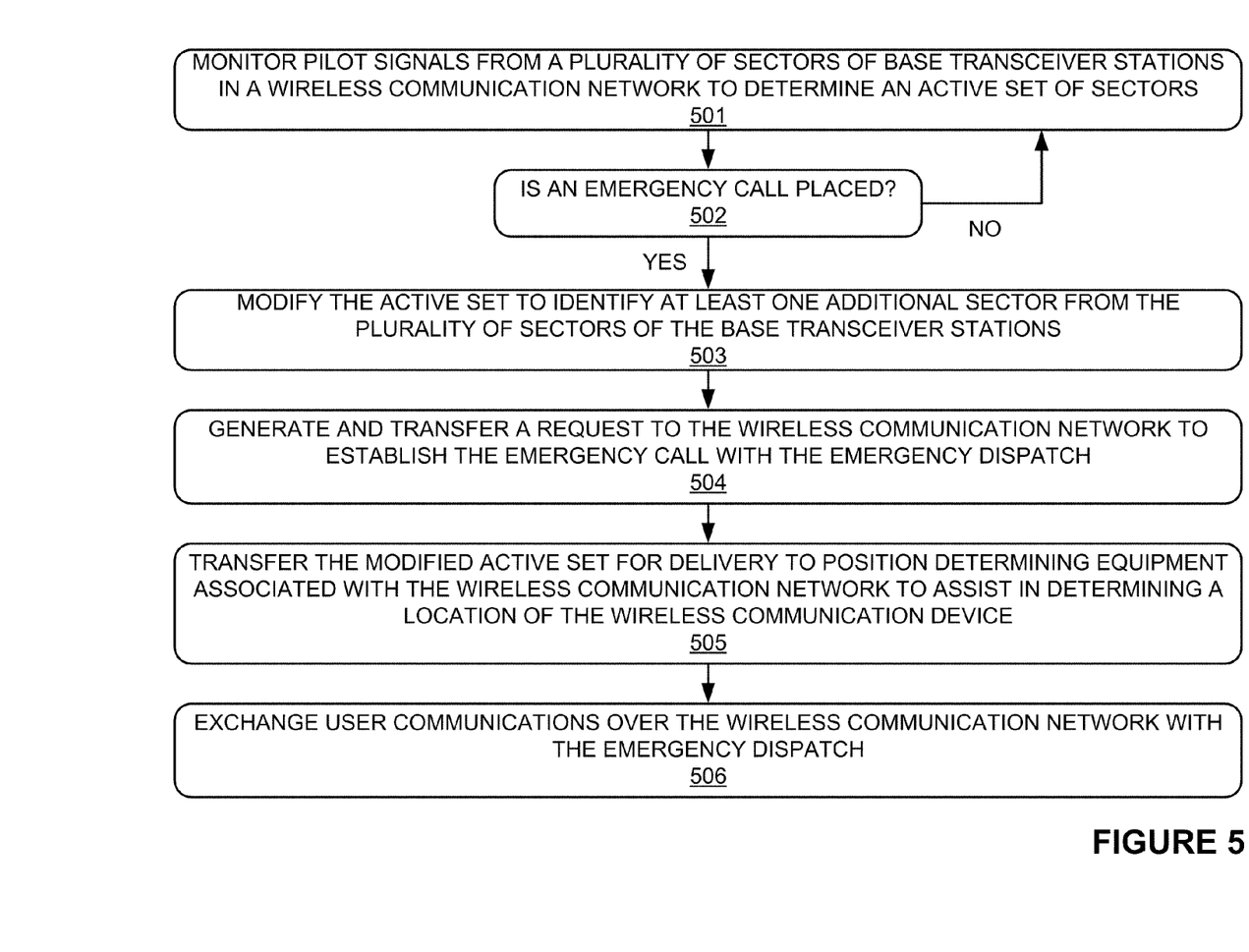
FIG. 5 is a flow diagram illustrating a method of operation of a communication system.

FIG. 5 is a flow diagram illustrating a method of operation of communication system 300, as shown in FIG. 3. The operations in FIG. 5 are listed herein parenthetically. In FIG. 5, WCD 310 monitors (501) pilot signals from a plurality of sectors of base transceiver stations to determine an active set of sectors. In the example shown in FIG. 3, the active set includes 3 sectors in, namely 322C, 325A, and 325B, as indicated by the shaded sectors.

In this example where CDMA is the wireless protocol, the active set is a group of sectors with which WCD 310 is currently exchanging communications, and includes sectors that WCD 310 is presently in a soft handoff process with. Pilot signals associated with each of the sectors associated with BTS 321-326 in communication system 300 are monitored by WCD 310 to determine an RF signal strength of each pilot signal. If the RF signal strength of a particular pilot signal exceeds a threshold level, WCD 310 transfers a pilot strength measurement message (PSMM) for delivery to the sector associated with the pilot signal. A PSMM includes information regarding the RF signal strength as measured by WCD 310 and a request to initiate soft handoff therewith, among other information. The sector will respond by allocating resources for WCD 310 and transferring a response to WCD 310 indicating a soft handoff is ready to proceed. In some examples, wireless communication network 350 must approve sectors prior to WCD 310 adding them into an active set.

Also, in many examples, WCD 310 may be initially only exchanging communications with a first sector. Then, a PSMM regarding a second sector would be transferred through the first sector. The PSMM could then be routed through BSC 340 for delivery to the second sector. The second sector can then transfer a response to the PSMM through BSC 340 to delivery to WCD 310 via the first sector. WCD 310 and the second sector can then proceed with a registration process, and WCD 310 will be in soft handoff with both the first sector and the second sector. Additional sectors can be added into the active set in a similar manner. In many examples, including sectors in the active set indicates a state of soft handoff with the included sectors, where the soft handoff state indicates the sectors with which a wireless communication device is in active communication.

WCD 310 then determines (502) when an emergency call is placed by a user of WCD 310. If an emergency call has not been placed, no special action is taken. However, if an emergency call is placed, WCD 310 modifies (503) the active set to identify at least one additional sector from the sectors of BTS 321-326.

As discussed above, members of the active set are usually determined based upon certain parameters, such as an RF signal strength of a pilot signal associated with a sector. However, in response to an emergency call, WCD 310 changes the parameter thresholds to increase the number of sectors in the active set. This parameter adjustment could include adjusting the parameters to include more sectors in the active set beyond what would normally be done in a non-emergency operation. Increasing the number of sectors in the active set can include initiating soft handoffs to each sector added, and may not be the most efficient operation to support traditional, non-emergency, user communications. To modify the active set in response to an emergency call, WCD 310 could modify the parameters or associated parameter thresholds related to monitoring the pilot signals of the various sectors in communication system 300. In some examples, the parameter thresholds are set by wireless communication network 350 or BTS 321-326, and WCD 310 must coordinate parameter threshold changes therewith.

In CDMA examples, the parameters related to monitoring the pilot signals typically include t_add, t_drop, t_comp, and t_tdrop, although a different set of parameters could be monitored. These parameters are also, in typical examples, measured by a wireless communication device. T_add includes a threshold RF signal strength level for a pilot signal that, when exceeded, a wireless communication device will begin the process to add the sector associated with the pilot signal into the active set. T_drop includes a threshold RF signal strength level for a pilot signal that, when fallen below, a wireless communication device will begin the process to remove the sector associated with the pilot signal from the active set. In many examples of t_drop, a timer is started if the threshold level is fallen below, indicated by t_tdrop. If the RF signal strength of a pilot signal remains below the t_drop threshold for longer than the timer t_tdrop, then the associated sector is removed from the active set. T_comp includes a comparison threshold for comparing the RF signal strength of two pilot signals for different sectors instead of an absolute threshold. For example, when a pilot signal is higher or lower than the t_comp threshold from another comparison pilot signal, a similar action to crossing the thresholds of t_add or t_drop could be taken.

As shown in FIG. 4, WCD 310 has increased the number of sectors identified in the active set, to create the modified active set. The modified active set includes sectors 321C and 326A, in addition to the previous sectors identified in the active set, namely 322C, 325A, and 325B. The modified active set now includes 5 sectors, as indicated by the shaded sectors in FIG. 4.

WCD 310 then generates and transfers (504) a request to wireless communication network 350 to establish the emergency call with emergency dispatch system 390. In this example, the request for the emergency call is transferred through a BTS for delivery to wireless communication network 350. WCD 310 transfers (505) the modified active set for delivery to PDE 360 associated with wireless communication network 350 to assist in determining a location of WCD 310. In this example, the modified active set is transferred through a BTS for delivery to wireless communication network 350.

PDE 360 will then attempt to locate WCD 310 in communication system 300 to help emergency dispatch system 390 provide location-based emergency services to WCD 310. In some examples, PDE 360 determines a location of WCD 310 through a triangulation method by monitoring RF signal strengths of communications of WCD 310 as detected across several base transceiver stations or sectors. In other examples, PDE 390 determines a BTS through which WCD 310 is actively communicating to determine a geographic position. However, in this example, PDE 360 now has received an increased number of sectors based on the modified active set through which to determine a geographic position of WCD 310. Once a location has been determined for WCD 310, LDE 360 could transfer information related to the geographic position of WCD 310 to emergency dispatch system 390 through wireless communication network 350. Advantageously, by increasing the number of sectors identified in the active set in response to the emergency call, the accuracy of PDE 390 can be improved. Thus, the geographic position of WCD 310 can be established more accurately and emergency services can be deployed more effectively.

WCD 310 then exchanges (506) communications of the emergency call with emergency dispatch system 390 through wireless communication network 350. In further examples, WCD 310 may again modify the active set to decrease the number sectors identified in the active set once the geographic position of WCD 310 has been established. This may occur upon indication that the emergency call has been connected to emergency dispatch system 390, upon completion of the emergency call, or at another time.

It should be understood that although an emergency call or emergency service session is discussed herein, the active set could be modified in response to a user application, location-based service request, or other user request in further examples.

Figure 6:
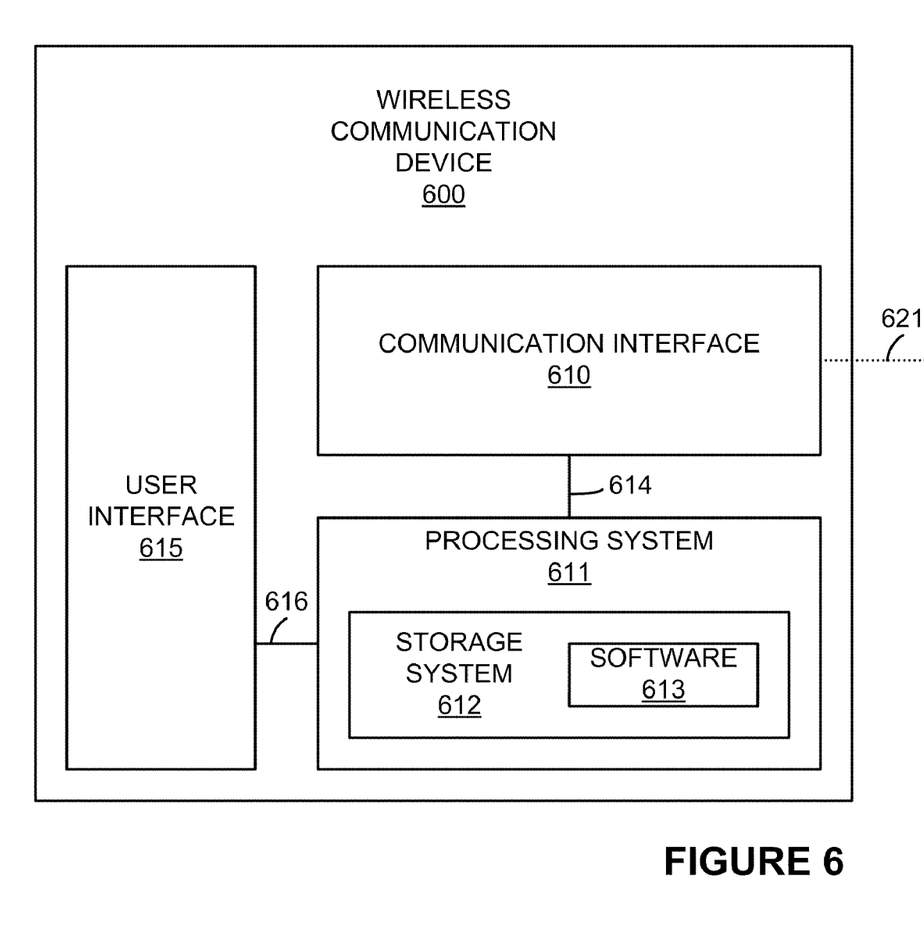
FIG. 6 is a block diagram illustrating an example of a wireless communication device.

FIG. 6 is a block diagram illustrating an example of wireless communication device 600, as an example of WCD 110 found in FIG. 1 or WCD 310 found in FIGS. 3 and 4, although WCD 110 or WCD 310 could use other configurations. Wireless communication device 600 includes communication interface 610, processing system 611, and user interface 615. Communication interface 610 and processing system 611 communicate over link 614. User interface 615 and processing system 611 communicate over link 616. Communication interface 610 communicates with a wireless access node, omitted for clarity, over wireless link 621. Wireless communication device 600 may be distributed among multiple devices that together form elements 610-616.

Communication interface 610 comprises radio frequency (RF) communication circuitry and an antenna. Communication interface 610 could also include amplifiers, filters, modulators, and signal processing circuitry.

Processing system 611 retrieves and executes software 613 from storage system 612. Processing system 611 could incorporate a computer microprocessor, logic circuit, or some other processing device, and may be distributed among multiple processing devices. In some examples, processing system 611 or user interface 615 are located within the same equipment in which communication interface 610 is located. Storage system 612 could include a computer-readable medium such as a disk, tape, integrated circuit, server, or some other memory device, and also may be distributed among multiple memory devices. Software 613 may include an operating system, logs, utilities, drivers, networking software, and other software typically loaded onto a computer system. Software 613 could contain an application program, firmware, or some other form of computer-readable processing instructions. When executed by processing system 611, software 613 directs processing system 611 to operate as described herein.

User interface 615 includes equipment and circuitry for receiving user input and control. Examples of user interface 615 include push buttons, selection knobs, dials, switches, actuators, keys, keyboards, pointer devices, microphones, transducers, potentiometers, non-contact sensing circuitry, or other human-interface equipment. In some examples, user interface 615 also includes equipment to communicate information to a user of wireless communication device 600. Examples of the equipment to communicate information to the user could include indicator lights, lamps, light-emitting diodes, displays, haptic feedback devices, audible signal transducers, speakers, buzzers, alarms, or other indicator equipment, including combinations thereof.

Links 614 and 616 each comprises physical, logical, or virtual communication link, capable of communicating data, control signals, and communications, along with other information. In some examples, links 614 and 616 are each encapsulated within the elements of communication interface 610, processing system 611, or user interface 615, and may each be a software or logical link. In other examples, links 614 and 616 each use various communication media, such as air, space, metal, optical fiber, or some other signal propagation path, including combinations thereof. Links 614 and 616 could be direct links or might include various equipment, intermediate components, systems, and networks. Wireless link 621 could use various protocols or communication formats as described herein for wireless links 111-113, including combinations, variations, or improvements thereof.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device to handle an emergency service session, the method comprising:
    monitoring pilot signals from a plurality of wireless access nodes in a wireless communication network to determine an active set, wherein the active set identifies a subset of the plurality of wireless access nodes;
    in response to a request for an emergency service by a user of the wireless communication device, modifying the active set to identify at least one additional wireless access node from the plurality of wireless access nodes, resulting in a modified active set;
    generating and transferring a request for the emergency service session for delivery to the wireless communication network to establish the emergency service session with the emergency service;
    transferring the modified active set for delivery to the wireless communication network to assist with determining a location of the wireless communication device; and
    exchanging communications of the emergency service session with the wireless communication network.

2. The method of claim 1, wherein modifying the active set to identify at least one additional wireless access node from the plurality of wireless access nodes comprises adjusting parameters related to monitoring the pilot signals to identify at least one additional wireless access node from the plurality of wireless access nodes, resulting in the modified active set.

3. The method of claim 2, wherein the parameters related to monitoring the pilot signals include at least one of t_add, t_drop, t_comp, and t_tdrop.

4. The method of claim 1, wherein the active set comprises wireless access nodes confirmed by the wireless communication network to identify in the active set.

5. The method of claim 1, wherein transferring the modified active set for delivery to the wireless communication network to assist with determining the location of the wireless communication device comprises transferring the modified active set for delivery to terrestrial position determining equipment associated with the wireless communication network which determines a geographic position of the wireless communication device.

6. The method of claim 1, wherein the request for the emergency service comprises a 911 call placed by the user of the wireless communication device.

7. The method of claim 1, wherein monitoring the pilot signals from the plurality of wireless access nodes includes monitoring a signal strength of the pilot signals from the plurality of wireless access nodes.

8. The method of claim 1, further comprising:
in response to an end to the emergency service session, modifying the modified active set to remove at least one wireless access node from the modified active set.

9. The method of claim 8, wherein modifying the modified active set to remove at least one wireless access node from the modified active set comprises adjusting parameters related to monitoring the pilot signals to identify at least one wireless access node from the plurality of wireless access nodes to remove from the modified active set.

10. The method of claim 1, further comprising:
in response to an end to the emergency service session, modifying the modified active set to revert the modified active set back to the active set.

11. A wireless communication device to handle an emergency service session, comprising:
a communication interface configured to monitor pilot signals from a plurality of wireless access nodes in a wireless communication network;
a processing system configured to process the pilot signals to determine an active set, wherein the active set identifies a subset of the plurality of wireless access nodes;
in response to a request for an emergency service by a user of the wireless communication device, the processing system configured to modify the active set to identify at least one additional wireless access node from the plurality of wireless access nodes, resulting in a modified active set, and generate a request for the emergency service session to establish the emergency service session with the emergency service;
the communication interface configured to transfer the request for the emergency service session for delivery to the wireless communication network, transfer the modified active set for delivery to the wireless communication network to assist with determining a location of the wireless communication device, and exchange communications of the emergency service session with the wireless communication network.

12. The wireless communication device of claim 11, comprising:
in response to the request for the emergency service by the user of the wireless communication device, the processing system further configured to adjust parameters related to monitoring the pilot signals to modify the active set to identify at least one additional wireless access node from the plurality of wireless access nodes, resulting in the modified active set.

13. The wireless communication device of claim 11, wherein the parameters related to monitoring the pilot signals include at least one of t_add, t_drop, t_comp, and t_tdrop.

14. The wireless communication device of claim 11, wherein the active set comprises wireless access nodes confirmed by the wireless communication network to identify in the active set.

15. The wireless communication device of claim 11, comprising:
the communication interface configured to transfer the modified active set for delivery to terrestrial position determining equipment associated with the wireless communication network which determines a geographic position of the wireless communication device.

16. The wireless communication device of claim 11, wherein the request for the emergency service comprises a 911 call placed by the user of the wireless communication device.

17. The wireless communication device of claim 11, comprising:
the communication interface configured to monitor a signal strength of the pilot signals from the plurality of wireless access nodes.

18. The wireless communication device of claim 11, comprising:
in response to an end to the emergency service session, the processing system configured to modify the modified active set to remove at least one wireless access node from the modified active set.

19. The wireless communication device of claim 18, comprising:
in response to the end to the emergency service session, the processing system further configured to adjust parameters related to monitoring the pilot signals to modify the modified active set to identify at least one wireless access node to remove from the modified active set.

20. The wireless communication device of claim 11, comprising:
in response to the end to the emergency service session, the processing system further configured to modify the modified active set to revert the modified active set back to the active set.

* * * * *